US009256986B2

(12) United States Patent
Kasahara et al.

(10) Patent No.: US 9,256,986 B2
(45) Date of Patent: Feb. 9, 2016

(54) AUTOMATED GUIDANCE WHEN TAKING A PHOTOGRAPH, USING VIRTUAL OBJECTS OVERLAID ON AN IMAGE

(71) Applicant: Sony Corporation, Tokyo (JP)

(72) Inventors: Shunichi Kasahara, Kanagawa (JP); Takuo Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 203 days.

(21) Appl. No.: 13/718,088

(22) Filed: Dec. 18, 2012

(65) Prior Publication Data
US 2013/0208005 A1 Aug. 15, 2013

(30) Foreign Application Priority Data
Feb. 10, 2012 (JP) ................................. 2012-026871

(51) Int. Cl.
G06T 19/00 (2011.01)
(52) U.S. Cl.
CPC .................................... G06T 19/006 (2013.01)
(58) Field of Classification Search
None
See application file for complete search history.

(56) References Cited

U.S. PATENT DOCUMENTS

| 2007/0242861 A1* | 10/2007 | Misawa et al. ................. 382/118 |
| 2009/0027337 A1* | 1/2009 | Hildreth ........................ 345/158 |
| 2011/0090390 A1* | 4/2011 | Narita ....................... 348/333.03 |
| 2011/0279697 A1* | 11/2011 | Shingu et al. .............. 348/222.1 |
| 2012/0113004 A1* | 5/2012 | Ohta ............................. 345/158 |
| 2014/0152699 A1* | 6/2014 | Oh ................................ 345/635 |

FOREIGN PATENT DOCUMENTS

JP 2011-87131 4/2011

OTHER PUBLICATIONS

Davison, Andrew J. "Real-time simultaneous localisation and mapping with a single camera." Computer Vision, 2003. Proceedings. Ninth IEEE International Conference on. IEEE, 2003.*

* cited by examiner

Primary Examiner — Phi Hoang
Assistant Examiner — Diane Wills
(74) Attorney, Agent, or Firm — Oblon, McClelland, Maier & Neustadt, L.L.P.

(57) ABSTRACT

There is provided an image processing device including a data acquisition unit configured to acquire a recommended angle-of-view parameter that represents a recommended angle of view for a subject in an environment that appears in an image, and a display control unit configured to overlay on the image a virtual object that guides a user so that an angle of view for capturing an image of the subject becomes closer to the recommended angle of view, using the recommended angle-of-view parameter. The recommended angle-of-view parameter is a parameter that represents a three-dimensional position and attitude of a device that captures an image of the subject at the recommended angle of view.

13 Claims, 15 Drawing Sheets $M_0$ : POSITION AND ATTITUDE OF TERMINAL (UNIT MATRIX)

$M_{recog}$ : POSITION AND ATTITUDE OF ENVIRONMENT WITH REFERENCE TO $M_0$ (ENVIRONMENT RECOGNITION MATRIX)

$M_{recog}^{-1}$ : INVERSE MATRIX OF ENVIRONMENT RECOGNITION MATRIX $M_{recog} \cdot M_{recog}^{-1} = M_0$

FIG.6

| REFERENCE ENVIRONMENT | SUBJECT ID | RECOMMENDED ANGLE-OF-VIEW ID | ANGLE-OF-VIEW PARAMETER | DATE AND TIME | RECOMMENDED IMAGE |
|---|---|---|---|---|---|
| En1 | B1 | V11 | M ang_rec11 | T11 | ... |
| En1 | B1 | V12 | M ang_rec12 | T12 | ... |
| En1 | B2 | V21 | M ang_rec21 | T21 | ... |
| .. | .. | .. | .. | .. | .. |
| En2 | B5 | V51 | M ang_rec51 | T51 | ... |
| .. | .. | .. | .. | .. | .. |

RECOMMENDED ANGLE-OF-VIEW DATA

AUTOMATED GUIDANCE WHEN TAKING A PHOTOGRAPH, USING VIRTUAL OBJECTS OVERLAID ON AN IMAGE

BACKGROUND

The present disclosure relates to an image processing device, an image processing method, and a program.

In recent years, digital still cameras and digital video cameras have been used by many users. In addition, smartphones having camera modules capable of capturing still images or moving images have also been in widespread use. Consequently, opportunities for users who have no high image capturing skills to capture images have significantly increased.

Under such circumstance, JP 2011-087131A discloses a technology of assisting in the image capturing action of a user by displaying a composition frame, which represents a recommended composition, such that the composition frame is overlaid on an input image.

SUMMARY

However, in the technology disclosed in JP 2011-087131A, only a rectangular composition frame is arranged on a two-dimensional screen. Therefore, it is difficult for a user to grasp to which position in the three-dimensional real space the terminal should be moved to capture an image of a subject with the recommended composition.

Thus, it is desirable to provide an improved mechanism that can effectively assist a user in capturing an image of a subject in the three-dimensional space.

According to an embodiment of the present disclosure, there is provided an image processing device including a data acquisition unit configured to acquire a recommended angle-of-view parameter that represents a recommended angle of view for a subject in an environment that appears in an image, and a display control unit configured to overlay on the image a virtual object that guides a user so that an angle of view for capturing an image of the subject becomes closer to the recommended angle of view, using the recommended angle-of-view parameter. The recommended angle-of-view parameter is a parameter that represents a three-dimensional position and attitude of a device that captures an image of the subject at the recommended angle of view.

According to another embodiment of the present disclosure, there is provided an image processing method including acquiring a recommended angle-of-view parameter representing a three-dimensional position and attitude of a device that captures an image of a subject in an environment that appears in an image at a recommended angle of view, and overlaying on the image a virtual object for guiding a user so that an angle of view for capturing an image of the subject becomes closer to the recommended angle of view, using the recommended angle-of-view parameter.

According to still another embodiment of the present disclosure, there is provided a program for causing a computer to function as: a data acquisition unit configured to acquire a recommended angle-of-view parameter that represents a recommended angle of view for a subject in an environment that appears in an image; and a display control unit configured to overlay on the image a virtual object that guides a user so that an angle of view for capturing an image of the subject becomes closer to the recommended angle of view, using the recommended angle-of-view parameter. The recommended angle-of-view parameter is a parameter that represents a three-dimensional position and attitude of a device that captures an image of the subject at the recommended angle of view.

According to the technology of the present disclosure, it is possible to effectively assist a user in capturing an image of a subject in the three-dimensional space.

BRIEF DESCRIPTION OF THE DRAWINGS

FIG. 6 is an explanatory diagram illustrating a basic configuration example of recommended angle-of-view data;

DETAILED DESCRIPTION OF THE EMBODIMENT(S)

Figure 1:
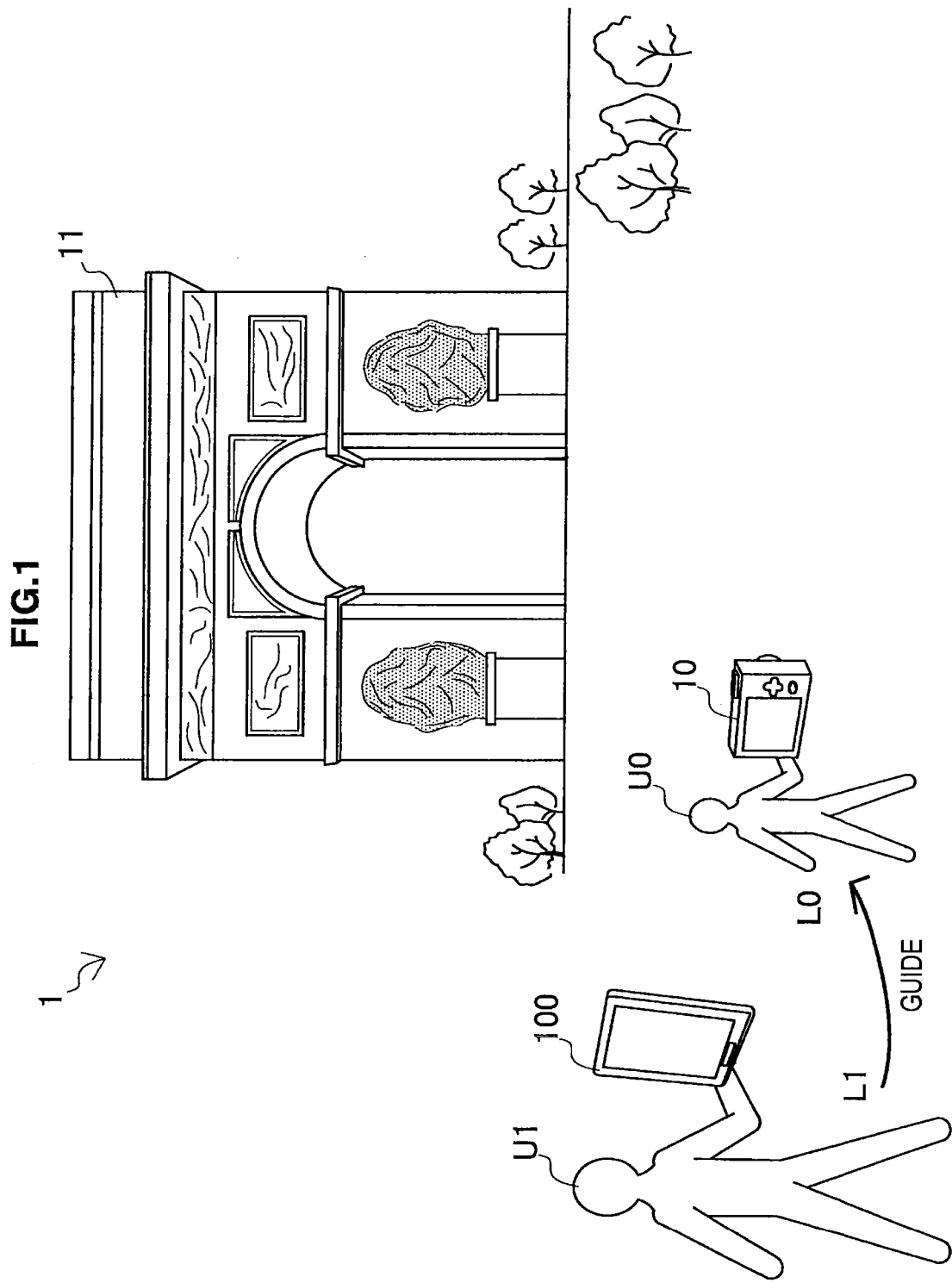
FIG. 1 is an explanatory diagram showing an example of an environment to which the technology according to the present disclosure can be applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.

1. System Overview 1-1. Description of Problem 1-2. Example of Parameters 1-3. System Configuration Example 2. Configuration of Image Processing Device
2-1. Hardware Configuration
2-2. Functional Configuration
3. Configuration of Data Server
4. Process Flow
5. Conclusion <1. System Overview>

First, a system overview according to an embodiment will be described with reference to FIGS. 1 to 6.

[1-1. Description of Problem]

FIG. 1 is an explanatory diagram showing an example of an environment to which the technology according to the present disclosure can be applied. Referring to FIG. 1, an environment 1 in which a subject 11 exists is exemplarily shown. FIG. 1 also shows a user U0 who captures an image of the subject 11 using an imaging device 10 at a position L0. For example, the user U0 is a professional user, and can determine the position and attitude of the imaging device 10 so that an image of the subject 11 can be captured at an excellent angle of view (camera angle). Further, FIG. 1 also shows a user U1 who captures an image of the subject 11 using an image processing device 100 at a position L1. The user U1 is a general user, and has no knowledge of an excellent angle of view for capturing an image of the subject 11. Under such circumstance, it would be advantageous for the user U1 who wants to capture an image of the subject 11 at an excellent angle of view if he/she is guided to bring the image processing device 100 so that it has about the same position and attitude as the imaging device 10.

The imaging device 10 and the image processing device 100 are devices that can freely move in the real space. Thus, it is important to make the user U1 adequately grasp the three-dimensional positional relationship between the recommended angle of view and the current angle of view, to guide the user U1. Based on such circumstance, the technology according to the present disclosure presents to a user a virtual object, which represents the three-dimensional positional relationship between the recommended angle of view and the current angle of view, together with an image of the real space, by applying the augmented reality (AU) technology.

[1-2. Example of Parameters]

In the technology according to the present disclosure, two angle-of-view parameters that are a recommended angle-of-view parameter and the current angle-of-view parameter are used. The recommended angle-of-view parameter is a parameter that represents the three-dimensional position and attitude of an imaging device that captures an image of a subject to be imaged at a recommended angle of view. The present angle-of-view parameter is a parameter that represents the three-dimensional position and attitude of the imaging device at a point in time when a process is executed. The recommended angle-of-view parameter and the current-angle-of-view parameter are determined on a common coordinate system. Such common coordinate system is referred to as a reference coordinate system in this specification. The reference coordinate system is defined in association with the reference environment.

Figure 2:
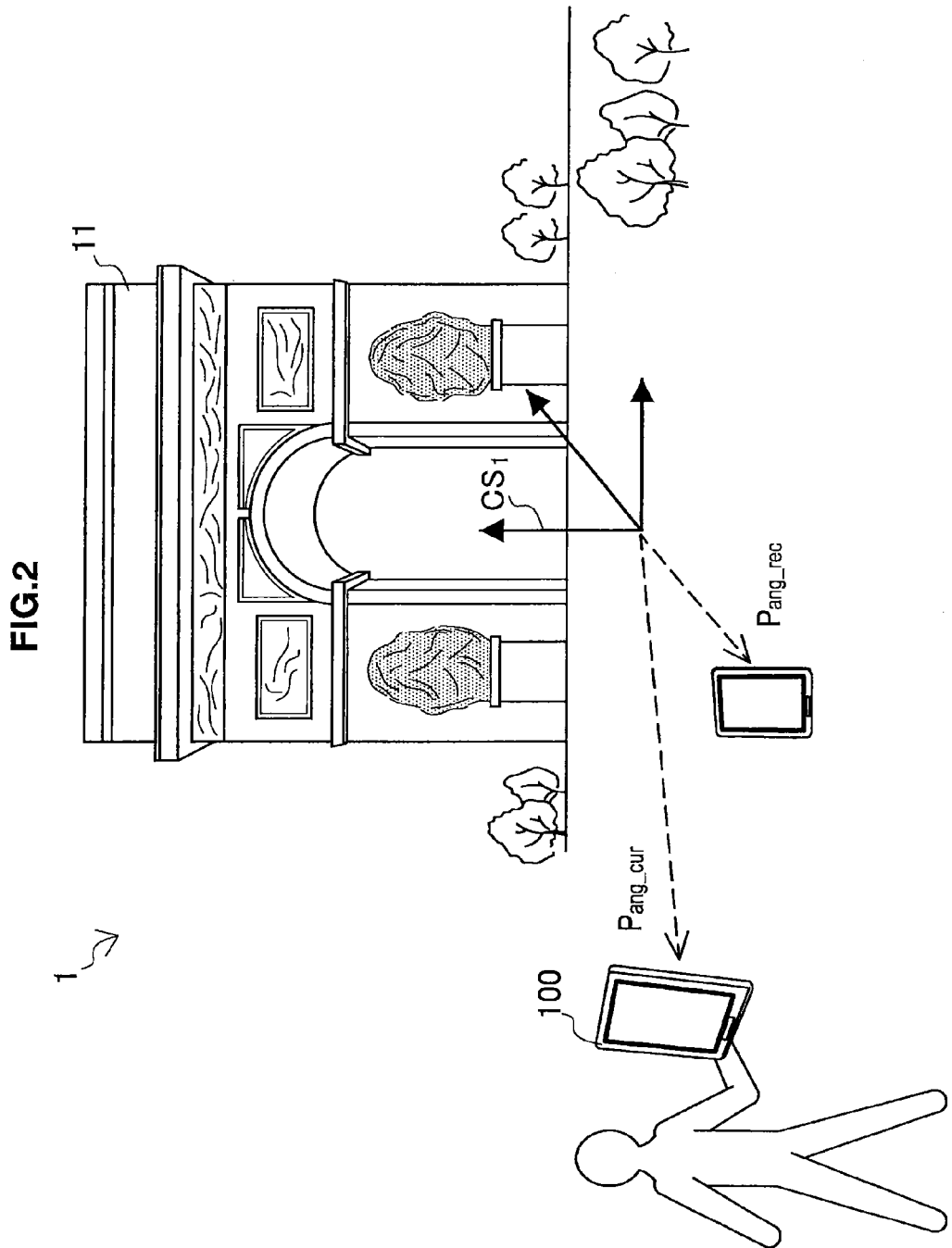
FIG. 2 is an explanatory diagram illustrating the basic principle of the technology according to the present disclosure.

For example, referring to FIG. 2, a reference coordinate system $CS_1$ associated with the environment 1, which is a reference environment, is shown. The position and attitude of the image processing device 100 are represented by the current angle-of-view parameter $P_{ang\_cur}$ in the reference coordinate system $CS_1$. For example, the three-dimensional position and attitude of the imaging device that captures an image of the subject 11 at a recommended angle of view are represented by a recommended angle-of-view parameter $P_{ang\_rec}$.

The image processing device 100 recognizes the current-angle-of-view parameter $P_{ang\_cur}$ and acquires the recommended angle-of-view parameter $P_{ang\_rec}$, and then guides a user so that the angle of view of the image processing device 100 becomes closer to the recommended angle of view.

Note that the reference environment is not limited to that shown in the example in FIGS. 1 and 2, and may be any indoor or outdoor environment. In addition, the reference environment may be defined with reference to a subject. That is, the reference coordinate system may be a coordinate system that is specific to a subject and is movable with the subject.

The angle-of-view parameters $P_{ang}$ (i.e., the recommended angle-of-view parameter and the current angle-of-view parameter) may be any types of parameters capable of representing the three-dimensional position and attitude in the reference coordinate system. In an embodiment described below, a coordinate transformation matrix that represents the position and attitude of an imaging device with reference to the position and attitude of the reference environment is used as the angle-of-view parameter. The coordinate transformation matrix herein may be typically a 4×4 homogeneous transformation matrix representing parallel displacement, rotation, and scaling (enlargement/shrinking) in the three-dimensional space. However, instead of the coordinate transformation matrix, it is also possible to use a set of variables, which represent the position and attitude, as the angle-of-view parameter $P_{ang}$.

Figure 3:
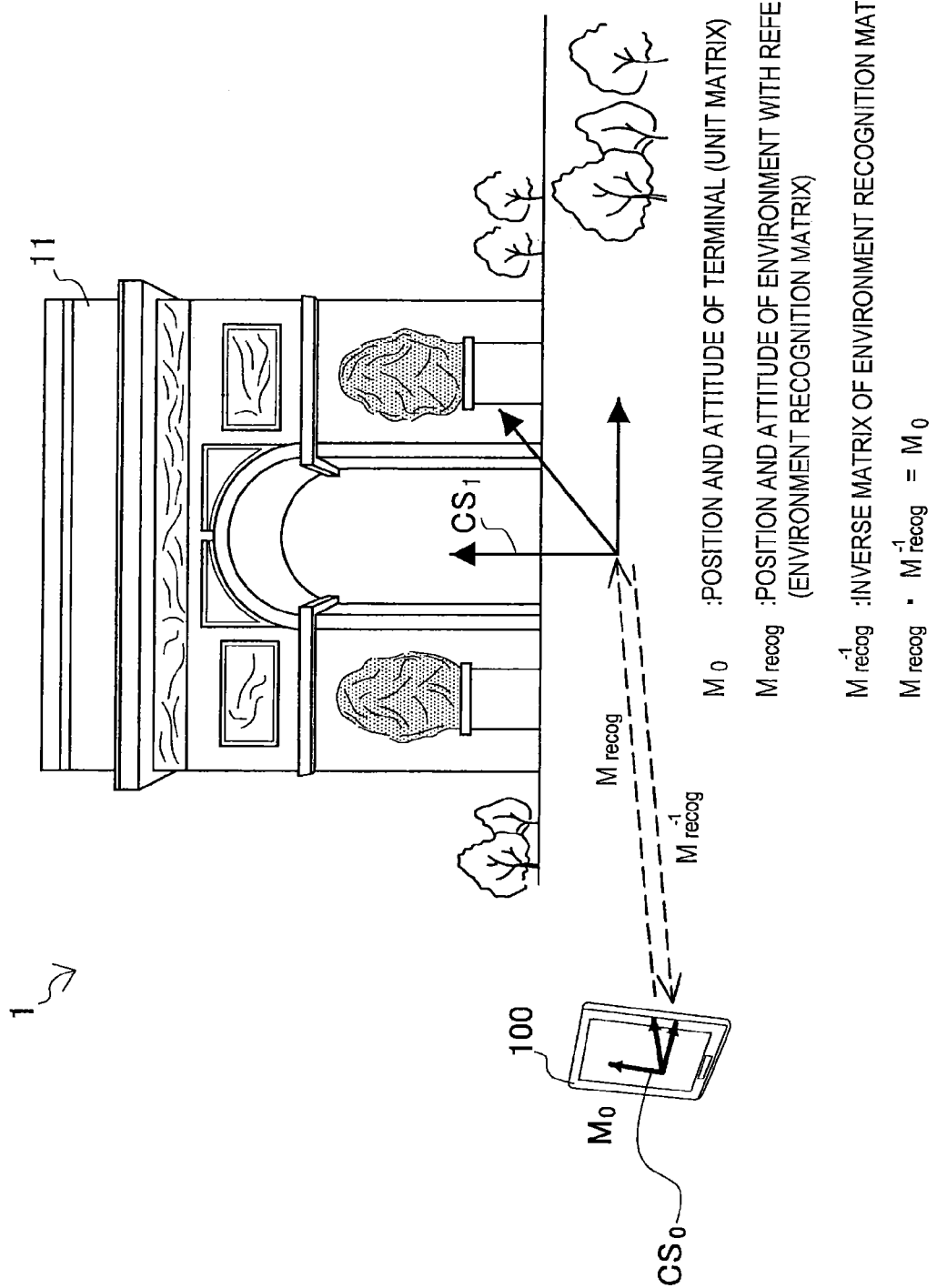
FIG. 3 is a first explanatory diagram illustrating an angle-of-view parameter used in an embodiment.
Figure 4:
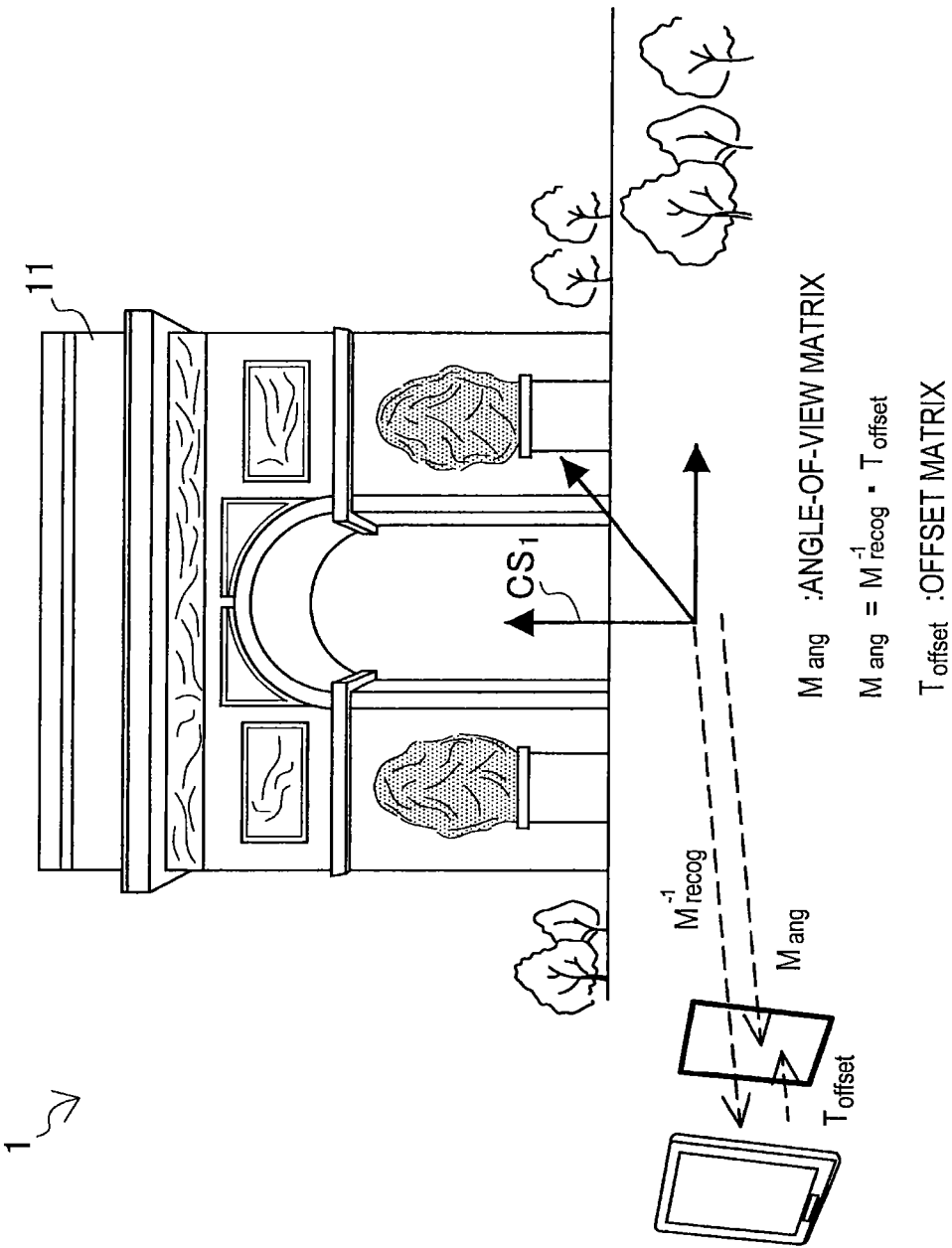
FIG. 4 is a second explanatory diagram illustrating an angle-of-view parameter used in an embodiment.

FIGS. 3 and 4 are explanatory diagrams each illustrating the angle-of-view parameters used in an embodiment;

Referring to FIG. 3, a reference coordinate system $CS_1$ associated with the reference environment 1 and a device-specific coordinate system $CS_0$ of the image processing device 100 are shown. The device-specific coordinate system $CS_0$ includes a two-dimensional coordinate axis and a depth axis of a screen, for example. The relative position and attitude of the reference coordinate system $CS_1$ with reference to the device-specific coordinate system $CS_0$ of the image processing device 100 can be recognized using an input image by utilizing a known image recognition technology. The image recognition technology utilized herein may be, for example, a SfM (Structure from Motion) method, a SLAM (Simultaneous Localization And Mapping) method, a method that utilizes holography calculated on the basis of matching between a captured image and a known image, or a method that utilizes heuristic information (e.g., face position or feature point distribution). Instead of such image recognition technology, it is also possible to use a simpler environment recognition technology that uses an infrared sensor or a depth sensor.

Herein, it is assumed that the position and attitude of the device-specific coordinate system $CS_0$ of the image processing device 100 are represented by a unit matrix $M_0$. Then, it becomes possible to recognize a given position and attitude in the reference environment 1 as a coordinate transformation $M_0$ (parallel displacement, rotation, and scaling) from the matrix $M_0$. Thus, a set of a position and attitude is represented by a single coordinate transformation matrix. The environment recognition matrix $M_{recog}$ shown in FIG. 3 is one of such coordinate transformation matrix. The environment recognition matrix $M_{recog}$ represents the position and attitude of the reference coordinate system $CS_1$ with reference to the position and attitude of the image processing device 100 (i.e., the unit matrix $M_0$).

Under the aforementioned premise, an inverse matrix $M_{recog}^{-1}$ of the environment recognition matrix $M_{recog}$ a matrix representing the position and attitude of the image processing device 100 with reference to the position and attitude of the reference coordinate system $CS_1$, that is, an angle of view. FIG. 3 conceptually shows coordinate transformation represented by the inverse matrix $M_{recog}^{-1}$ of the environment recognition matrix.

An angle-of-view matrix $M_{ang}$ shown in FIG. 4 is an angle-of-view parameter representing the position and attitude of the imaging device. The angle-of-view of-view matrix $M_{ang}$ may be equal to the inverse matrix $M_{recog}^{-1}$ of the environment recognition matrix $M_{recog}$ as represented in the following formula, for example.

$$M_{ang} = M_{recog}^{-1} \quad (1)$$

In the technology according to the present disclosure, guidance of an angle of view is performed by overlaying a virtual object, which is three-dimensionally arranged on the basis of the current angle of view and the recommended angle of view of the imaging device, on an image. For example, in order to show the current angle of view of the imaging device using a virtual object, the virtual object can be preferably arranged at not the position of the imaging device but at a position slightly ahead of the imaging device. In that case, the angle-of-view matrix $M_{ang}$ may be determined as the following formula by including an offset matrix $T_{offset}$ conceptually shown in FIG. 4 into calculation.

$$M_{ang} = M_{recog}^{-1} \cdot T_{offset} \quad (2)$$

The offset matrix $T_{offset}$ is a coordinate transformation matrix representing parallel displacement from the position of the imaging device in the imaging direction (the depth direction) of the input image by a predetermined distance.

The angle-of view matrix $M_{ang}$ determined as above can be utilized as either the aforementioned recommended angle-of-view parameter or the current angle-of-view parameter. For example, an angle-of-view matrix representing the position and attitude of the imaging device 10 shown in FIG. 1 can be utilized as the recommended angle-of-view parameter $M_{recog}$. In addition, the angle-of-view matrix representing the position and attitude of the image processing device 100 can be utilized as the current-angle-of-view parameter $M_{ang\_cur}$.

[1-3. System Configuration Example]

Figure 5:
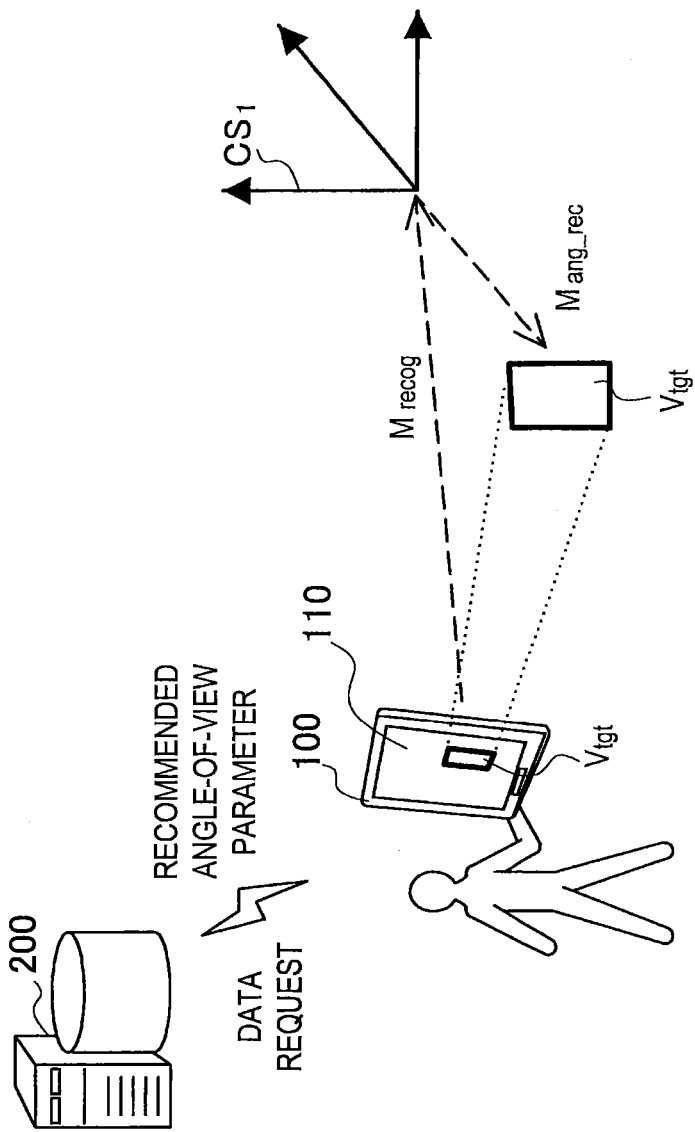
FIG. 5 is an explanatory diagram illustrating an overview of an image processing system according to an embodiment.

FIG. 5 is an explanatory diagram illustrating an overview of an image processing system that utilizes the aforementioned parameters. Referring to FIG. 5, the image processing device 100 and a data server 200 are shown.

The image processing device 100 is typically an imaging device having an imaging unit (not shown) and a display unit 110. The image processing device 100 receives from a data server 200 a recommended angle-of-view parameter $M_{ang\_rec}$ associated with a subject to be imaged. In addition, the image processing device 100 recognizes the environment recognition matrix $M_{recog}$ using the input image. Then, the image processing device 100 overlays a virtual object $V_{tgt}$ representing the recommended angle of view on the input image using the environment recognition matrix $M_{recog}$ and the recommended angle-of-view parameter $M_{ang\_rec}$. In the following description, the virtual object $V_{tgt}$ is referred to as a target object.

In FIG. 5, a tablet PC is shown as an example of the image processing device 100. However, the image processing device 100 is not limited thereto. The image processing device 100 may be any device having an imaging function such as, for example, a digital still camera, a digital video camera, a notebook PC, a pocket PC, a smartphone, a game terminal, a PND (Portable Navigation Device), or a content player.

The data server 200 is an information processing device including a database that has stored therein recommended angle-of-view parameters. The data server 200 stores the recommended angle-of-view data having a structure shown in FIG. 6 in the database. In the example in FIG. 6, the recommended angle-of-view data includes six data items: "reference environment," "subject ID," "recommended angle-of-view ID," "angle-of-view parameter," "date and time," and "recommended image." The "reference environment" is an identifier that identifies a reference environment associated with each recommended angle-of-view parameter. The "subject ID" is an identifier that identifies a subject associated with each recommended angle-of-view parameter. The "recommended angle-of-view ID" is an identifier for identifying each recommended angle-of-view parameter. The "angle-of-view parameter" is a data item that stores the recommended angle-of-view parameter. The "date and time" indicates the date and time when the recommended image was captured at the recommended angle of view. The "recommended image" is a data item that stores sample data of the recommended image captured at the recommended angle of view. The data server 200, in response to a data request from the image processing device 100, selects a recommended angle-of-view parameter to be distributed to the image processing device 100, and distributes the selected recommended angle-of-view parameter to the image processing device 100.

Note that the image processing device 100 need not necessarily acquire the recommended angle-of-view parameter from the data server 200. For example, the image processing device 100 may have the recommended angle-of-view parameter stored therein in advance, or may dynamically generate the recommended angle-of-view parameter as described below. Alternatively, the image processing device 100 may receive the recommended angle-of-view parameter from another device (e.g., the imaging device 10 exemplarily shown in FIG. 1) having an imaging function.

<2. CONFIGURATION OF IMAGE PROCESSING DEVICE>

[2-1. Hardware Configuration]

Figure 7:
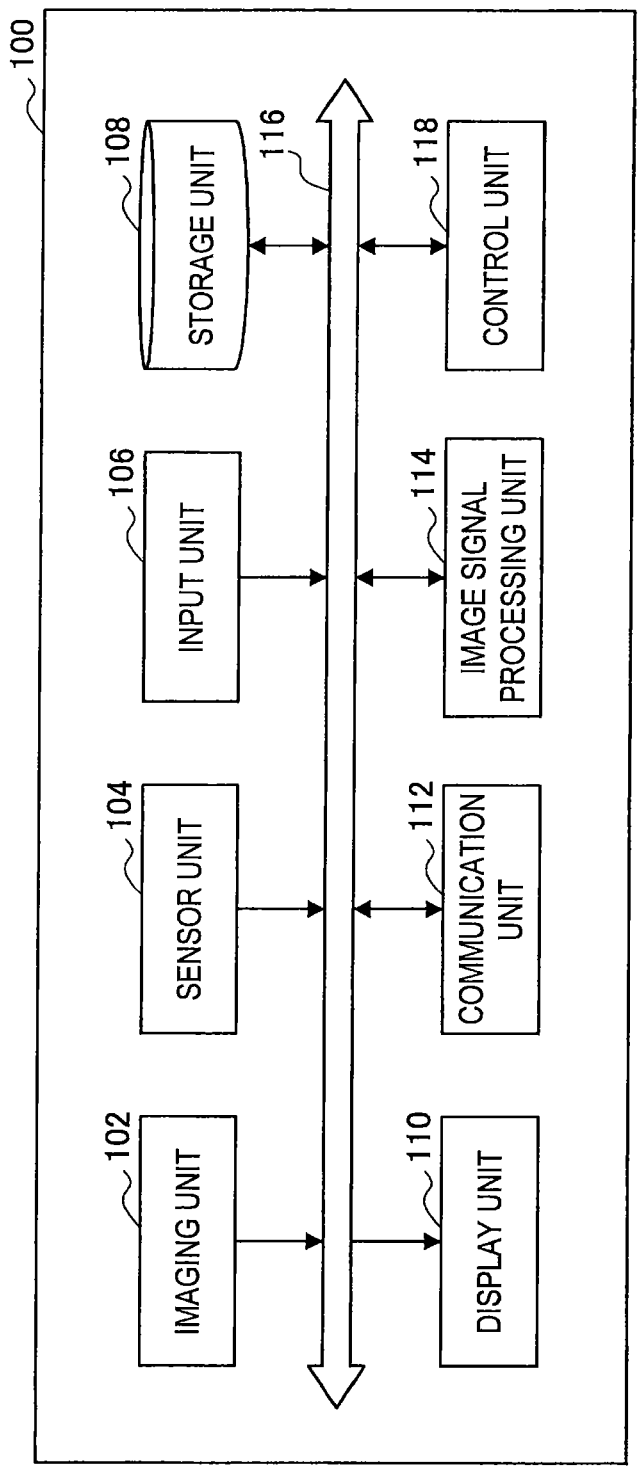
FIG. 7 is a block diagram showing an exemplary hardware configuration of an image processing device according to an embodiment.

FIG. 7 is a block diagram showing an exemplarily hardware configuration of the image processing device 100. Referring to FIG. 7, the image processing device 100 includes an imaging unit 102, a sensor unit 104, an input unit 106, a storage unit 108, a display unit 110, a communication unit 112, an image signal processing unit 114, a bus 116, and a control unit 118.

(1) Imaging Unit

The imaging unit 102 is a camera module that captures an image. The imaging unit 102 captures an image of the real space using an image sensor such as a CCD (Charge Coupled Device) or a CMOS (Complementary Metal Oxide Semiconductor), and generates the captured image. A series of captured images generated by the imaging unit 102 constitute a video. Note that the imaging unit 102 need not necessarily be a part of the image processing device 100. For example, an imaging device connected to the image processing device 100 by wire or wirelessly may be handled as the imaging unit 102. In addition, the imaging unit 102 may include a depth sensor that measures the distance between the imaging unit 102 and the subject on a per-pixel basis. The depth data output from the depth sensor can be utilized to recognize the environment.

(2) Sensor Unit

The sensor unit 104 can include various sensors such as a positioning sensor, an acceleration sensor, and a gyro sensor. The measurement result obtained by the sensor unit 104 may be used for various applications such as for assisting in the recognition of an environment, acquiring data on a geographical location, or detecting a user input. Note that the sensor unit 104 may be omitted from the configuration of the image processing device 100.

(3) Input Unit

The input unit 106 is an input device used for a user to operate the image processing device 100 or input information to the image processing device 100. The input unit 106 may include, for example, a touch sensor that detects a touch of a user on the screen of the display unit 110. Alternatively (or additionally), the input unit 106 may include a pointing device such as a mouse or a touch pad. Further, the input unit 106 may include other types of input device such as a keyboard, a keypad, a button, or a switch.

(4) Storage Unit

The storage unit 108 includes a storage medium such as semiconductor memory or a hard disk, and stores programs and data for processes to be performed by the image processing device 100. Data stored in the storage unit 108 can include, for example, data on the captured image, sensor data, and the aforementioned various parameters. Note that some of the programs and data described in this specification may also be acquired from an external data source (e.g., a data server, a network storage, or external memory) without being stored in the storage unit 108.

(5) Display Unit

The display unit 110 is a display module including a display such as a LCD (Liquid Crystal Display), an OLED (Organic Light-Emitting Diode), or a CRT (Cathode Ray Tube). The display unit 110 is used to display an output image generated by the image processing device 100, for example. Note that the display unit 110 need not necessarily be a part of the image processing device 100, either. For example, a display device connected to the image processing device 100 by wire or wirelessly may be handled as the display unit 110.

(6) Communication Unit

The communication unit 112 is a communication interface that intermediates communication of the image processing device 100 with another device. The communication unit 112 supports a given wireless communication protocol or wire communication protocol, and establishes communication connection with another device.

(7) Image Signal Processing Unit

The image signal processing unit 114 encodes an image according to a predetermined image encoding scheme when an image is recorded or transmitted. In addition, the image signal processing unit 114 decodes an image according to a predetermined image encoding scheme when an encoded image is displayed.

(7) Bus

The bus 116 mutually connects the imaging unit 102, the sensor unit 104, the input unit 106, the storage unit 108, the display unit 110, the communication unit 112, the image signal processing unit 114, and the control unit 118.

(9) Control Unit

The control unit 118 corresponds to a processor such as a CPU (Central Processing Unit) or a DSP (Digital Signal Processor). The control unit 118 causes various functions of the image processing device 100 described below to operate by executing programs stored in the storage unit 108 or another storage medium.

[2-2. Functional Configuration]

Figure 8:
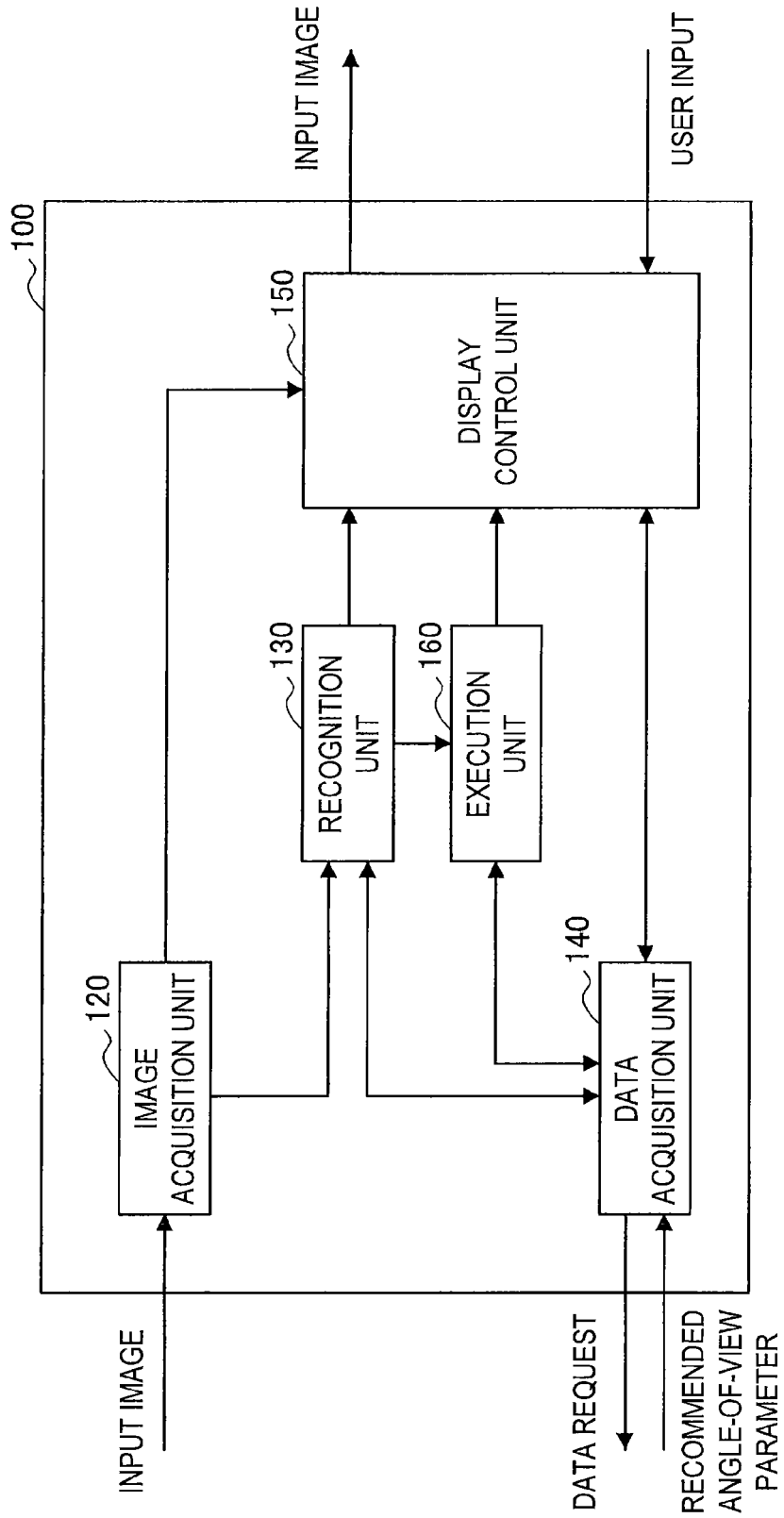
FIG. 8 is a block diagram showing an exemplary configuration of the logical function of an image processing device according to an embodiment.

FIG. 8 is a block diagram showing an exemplary configuration of the logical function implemented by the storage unit 108 and the control unit 118 of the image processing device 100 shown in FIG. 7. Referring to FIG. 8, the image processing device 100 includes an image acquisition unit 120, a recognition unit 130, a data acquisition unit 140, a display control unit 150, and an execution unit 160.

(1) Image Acquisition Unit

The image acquisition unit 120 acquires a captured image generated by the imaging unit 102 as an input image. The input image acquired by the image acquisition unit 120 may be an individual frame that partially constitutes a video of the real space. The image acquisition unit 120 outputs the acquired input image to the recognition unit 130 and the display control unit 150.

(2) Recognition Unit

The recognition unit 130 recognizes a parameter representing the current angle of view of the image processing device 100 using the input image input from the image acquisition unit 120.

More specifically, the recognition unit 130 first recognizes the aforementioned environment recognition matrix representing the position and attitude of the reference environment. The recognition unit 130 can utilize a known image recognition technology such as a SfM method or a SLAM method to recognize the environment recognition matrix. For example, when the SLAM method is utilized, the recognition unit 130 updates the position, attitude, speed, and angular velocity of the terminal, and a state variable, which includes the position(s) of one or more feature points in the input image, on a per-frame basis based on the principle of the expanded Kalman filter. Accordingly, the position and attitude of the reference environment with reference to the position and attitude of the terminal can be recognized using an input image from a monocular camera. The recognition unit 130 represents the position and attitude of the recognized reference environment using an environment recognition matrix $M_{recog}$ corresponding to the coordinate transformation from the position and attitude of the terminal. Note that the SLAM method is described in detail in "Real-Time Simultaneous Localization and Mapping with a Single Camera" (Andrew J. Davison, Proceedings of the 9th IEEE International Conference on Computer Vision Volume 2, 2003, pp. 1403-1410).

The recognition unit 130, when the environment recognition matrix $M_{recog}$ is recognized, calculates an inverse matrix $M_{recog}^{-1}$ of the environment recognition matrix. For example, the environment recognition matrix $M_{recog}$ is a 4×4 homogeneous transformation matrix. Thus, the inverse matrix $M_{recog}^{-1}$ of the environment recognition matrix is also a 4×4 homogeneous transformation matrix, and satisfies $M_{recog} \cdot M_{recog}^{-1} = M_0$ (unit matrix). Then, the recognition unit 130 can determine the current angle-of-view parameter $M_{ang\_cur}$ that is equal to the inverse matrix $M_{recog}^{-1}$ of the environment recognition matrix according to Formula (1) above. Alternatively, the display control unit 150 may include the aforementioned offset matrix $T_{offset}$ into calculation to determine the current angle-of-view parameter $M_{ang\_cur}$ according to Formula (2) above.

The recognition unit 130 outputs the thus recognized current angle-of-view parameter $M_{ang\_cur}$ to the data acquisition unit 140, the display control unit 150, and the execution unit 160. The recognition unit 130 outputs the environment recognition matrix $M_{recog}$ to the display control unit 150.

The recognition unit 130 may also recognize a subject in the input image. For example, known feature quantity data on a subject to be imaged is stored in the image processing device 100 in advance, or is acquired from the data server 200 by the data acquisition unit 140. Then, the recognition unit 130 can, by checking the feature quantity data extracted from the input image against the known feature quantity data, recognize a subject in the input image. An identifier of the subject recognized in this manner can be used to request data to the server 200.

(3) Data Acquisition Unit

The data acquisition unit 140 acquires a parameter representing the recommended angle of view for a subject in the reference environment. The recommended angle-of-view parameter acquired by the data acquisition unit 140 in this embodiment is a 4×4 homogeneous transformation matrix representing the recommended angle of view with reference to the position and attitude of the reference environment. For example, the data acquisition unit 140 transmits a data request requesting distribution of the recommended angle-of-view parameter to the data server 200. Then, the data acquisition unit 140 receives the recommended angle-of-view parameter distributed from the data server 200.

The data acquisition unit 140 may include position data, which represents the geographical position of the image processing device 100 measured by the sensor unit 104, into the data request, for example. In that case, the data server 200 can select a recommended angle-of-view parameter associated with a subject near the geographical position, and distribute the selected recommended angle-of-view parameter to the image processing device 100.

Alternatively, the data acquisition unit 140 may include an identifier of a subject recognized by the recognition unit 130 or specified by a user into the data request. In that case, the data server 200 can select a recommended angle-of-view parameter associated with a subject identified by the identifier, and distribute the selected recommended angle-of-view parameter to the image processing device 100.

As a further alternative, the data acquisition unit 140 may, by acquiring from the data server 200 a plurality of sets of recommended angle-of-view parameters and recommended images corresponding thereto, and presenting the plurality of acquired recommended images to a user, make the user specify a desired recommended image. In that case, a recommended angle-of-view parameter corresponding to the recommended image specified by the user can be used to guide the angle of view.

The data acquisition unit 140 outputs the thus acquired recommended angle-of-view parameter to the display control unit 150 and the execution unit 160.

(4) Display Control Unit

The display control unit 150, using the recommended angle-of-view parameter input from the data acquisition unit 140, overlays a virtual object, which guides a user so that the angle of view for capturing an image of a subject becomes close to the recommended angle of view, on the input image. For example, the display control unit 150 arranges a target object $V_{tgt}$ having a position and attitude represented by the recommended angle-of-view parameter in the reference environment. The target object $V_{tgt}$ may be a simple rectangular virtual object such as the one exemplarily shown in FIG. 5. Instead, the target object $V_{tgt}$ may be, for example, a three-dimensional virtual object that mimics the shape of a camera. Next, the display control unit 150 generates an output image by projecting the target object $V_{tgt}$ onto a screen of the display unit 110 and thus overlaying the target object $V_{tgt}$ on the input image. Then, the display control unit 150 displays the generated output image on the screen of the display unit 110. For example, the way in which the target object $V_{tgt}$ looks from the image processing device 100 can be represented as the following coordinate transformation corresponding to the product of the recommended angle-of-view parameter $M_{ang\_rec}$ and the environment recognition matrix $M_{recog}$ at that point in time (see FIG. 5).

$$M_{recog} \cdot M_{ang\_rec} \tag{1}$$

The display control unit 150 may overlay, in addition to the target object $V_{tgt}$, one or more intermediate objects, which represent(s) an intermediate angle(s) of view between the recommended angle of view and the current angle of view, on the input image. For example, the display control unit 150 can determine the arrangement of an intermediate object(s) that interpolate(s) an angle(s) of view between the recommended angle of view and the current angle of view in the reference environment, using the recommended angle-of-view parameter $M_{ang\_rec}$ and the current angle-of-view parameter $M_{ang\_cur}$ input from the recognition unit 130.

Figure 9:
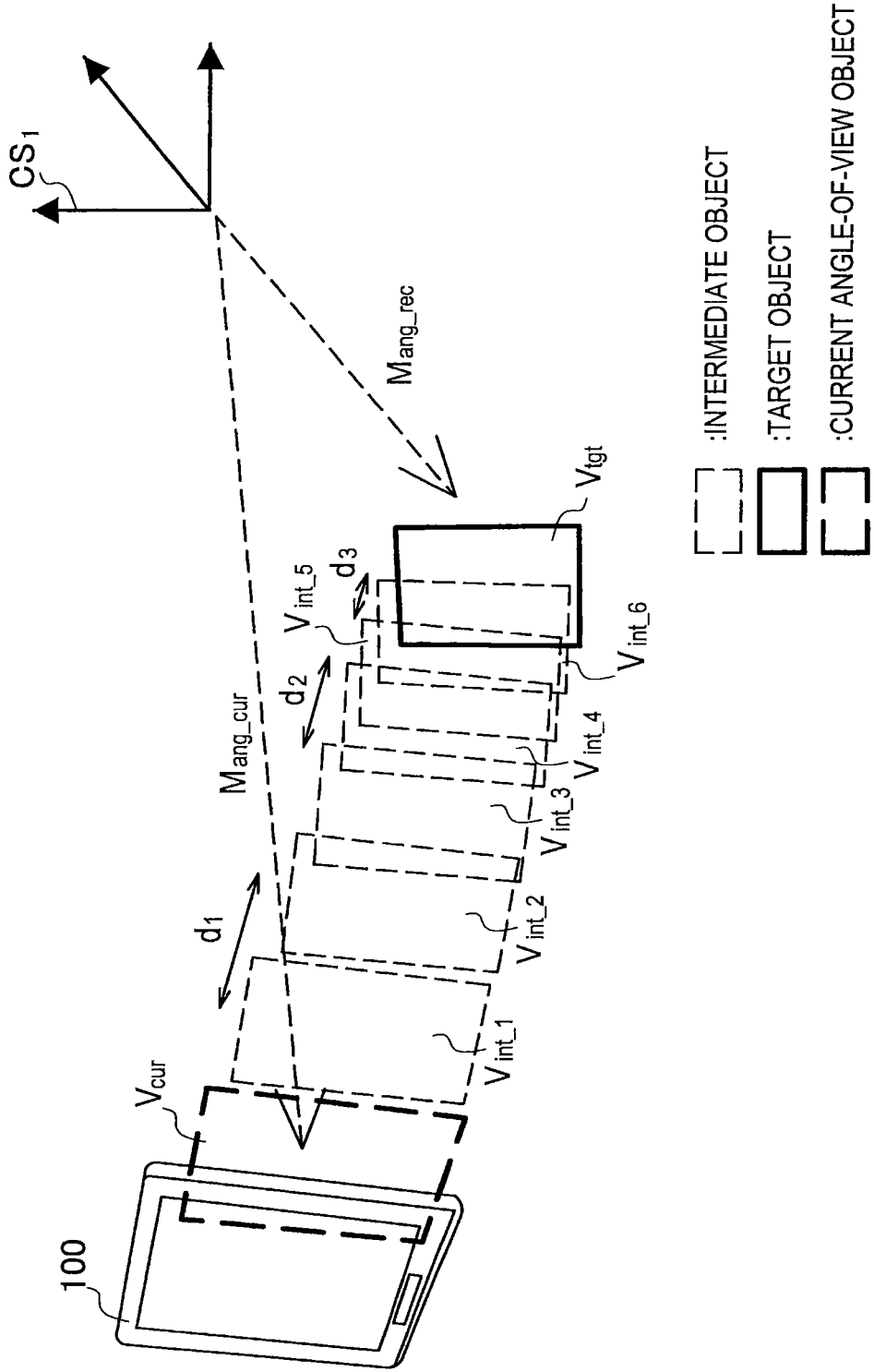
FIG. 9 is an explanatory diagram illustrating an example of interpolation of an intermediate angle(s) of view.

FIG. 9 is an explanatory diagram illustrating an example of interpolation of an intermediate angle of view. Referring to FIG. 9, the current angle-of-view object $V_{cur}$, the target object $V_{tgt}$, and six intermediate objects $V_{Int\_1}$ to $V_{int\_6}$ arranged between the two virtual objects are shown. The current angle-of-view object $V_{cur}$ includes a position and attitude represented by the current angle-of-view parameter $M_{ang\_cur}$ in the reference coordinate system $CS_1$. The target object $V_{tgt}$ has a position and attitude represented by the recommended angle-of-view parameter $M_{ang\_rec}$ in the reference coordinate system $CS_1$. Each of the intermediate objects $V_{int\_1}$ to $V_{int\_6}$ has a position and attitude determined through linear interpolation or non-linear interpolation (e.g., curve interpolation) between the current angle-of-view parameter $M_{ang\_cur}$ and the recommended angle-of-view parameter $M_{ang\_rec}$. Note that the number of the intermediate objects arranged is not limited to the example in FIG. 9. The display control unit 150 may arrange a different number of intermediate objects $V_{int}$ according to the distance between the current angle-of-view object $V_{cur}$ and the target object $V_{tgt}$.

In this embodiment, the display control unit 150 arranges the intermediate objects $V_{int}$ at positions and attitudes interpolated at non-even intervals between the recommended angle of view and the current angle of view. In the example in FIG. 9, the distance d1 between the intermediate object $V_{int\_1}$ and the intermediate object $V_{int\_2}$ is longer than the distance d2 between the intermediate object $V_{int\_3}$ and the intermediate object $V_{int\_4}$. The distance d2 between the intermediate object $V_{int\_3}$ and the intermediate object $V_{int\_4}$ is longer than the distance d3 between the intermediate object $V_{int\_5}$ and the intermediate object $V_{int\_6}$. By overlaying intermediate objects, which are arranged at non-even intervals in this manner, on the input image, it becomes possible to visually represent the direction of guidance toward the recommended angle of view.

Figure 10:
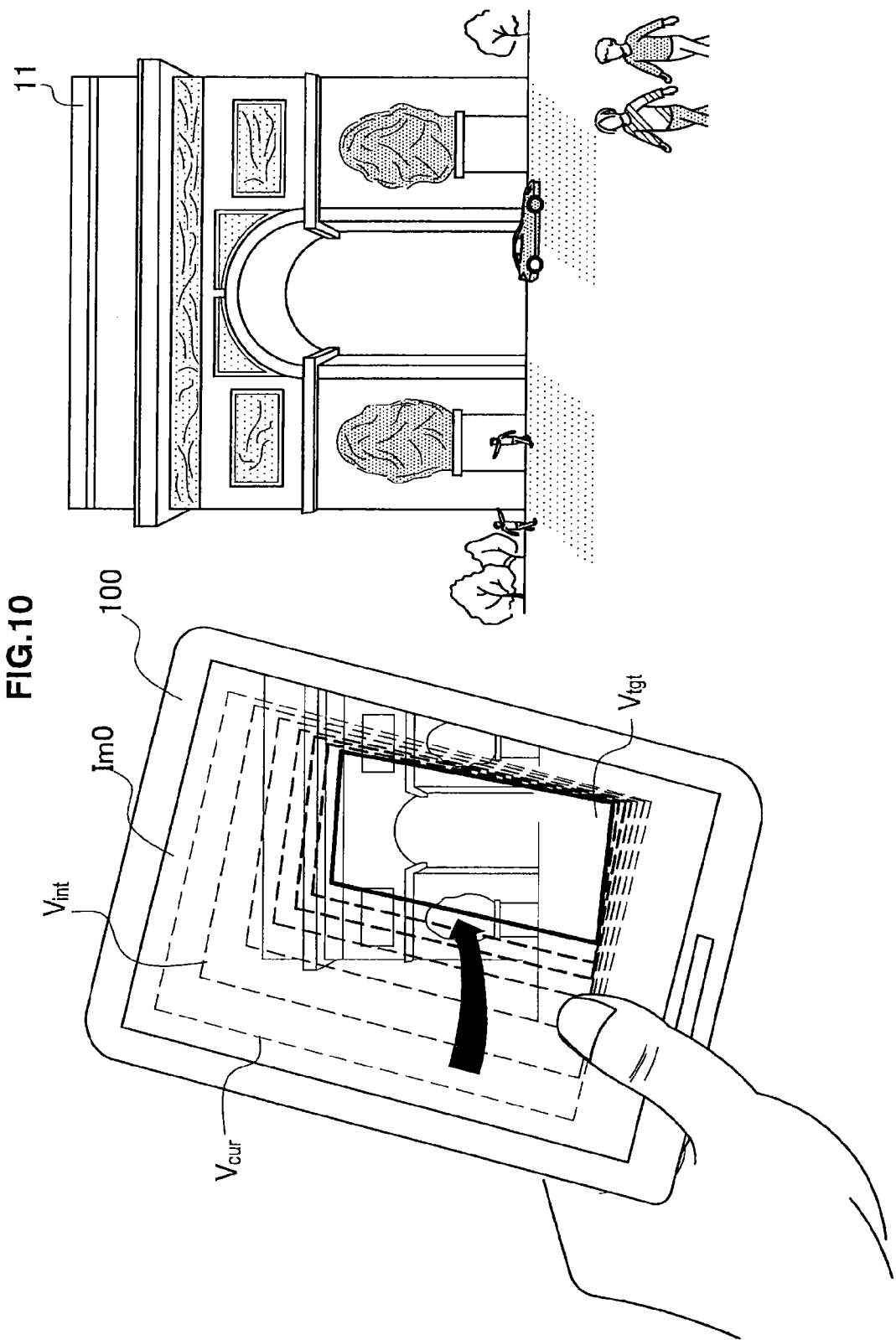
FIG. 10 is an explanatory diagram illustrating an exemplary display for guiding an angle of view.

The display control unit 150 may change the display attributes of the intermediate objects in a stepwise manner. The display attributes herein may be any attribute such as luminance, color, or transparency of the intermediate objects or the thickness of frame lines. FIG. 10 is an explanatory diagram illustrating an exemplary display for guiding an angle of view. Referring to FIG. 10, a subject 11 appears in an output image Im0 displayed by the image processing device 100. In addition, the current angle-of-view object $V_{cur}$, the target object $V_{tgt}$, and a plurality of intermediate objects $V_{int}$ are overlaid on the output image Im0. The frame line of the intermediate object $V_{int}$ is thicker at a position closer to the target object $V_{tgt}$. In addition, the luminance of the intermediate object $V_{int}$ is higher at a position closer to the target object $V_{tgt}$. When the display attributes are controlled in this manner, it is possible to perform guidance in the depth direction in a more understandable manner even when a two-dimensional screen is used.

In the example in FIG. 10, a user is guided so that the image processing device 100 is moved forward and the attitude of the image processing device 100 is rotated slightly. When the target object $V_{tgt}$ and the intermediate objects $V_{int}$ are overlaid on the input image in this manner, the user is able to easily grasp to which position and in what way the image processing device 100 should be moved in the three-dimensional real space to capture an image of the subject 11 at a more excellent angle of view.

Note that the display control unit 150 may also form an animation of guiding the user by sequentially overlaying a target object and one or more intermediate objects on a plurality of frames. For example, when an animation in which the intermediate objects $V_{int\_1}$ to $V_{Int\_6}$ in the example in FIG. 9 are sequentially displayed is displayed, it is possible to allow the user to more clearly grasp the direction of guidance toward the recommended angle of view.

Alternatively, the display control unit 150 may, by overlaying a target object and one or more intermediate objects on a single frame, form a track of an angle of view for guiding the user. When a track of an angle of view is statically displayed, it is possible to allow the user to more accurately move the image processing device 100 along the track of the angle of view.

(5) Execution Unit

The execution unit 160, when it is determined that the current angle of view of the imaging unit 102 is substantially equal to the recommended angle of view, causes the imaging unit 102 or the image processing device 100 to execute a predetermined operation. The execution unit 160 receives, for example, a recommended angle-of-view parameter from the data acquisition unit 140. In addition, the execution unit 160 receives from the recognition unit 130 the current angle-of-view parameter recognized for the latest frame. Then, the execution unit 160 calculates the difference of the parallel displacement components and the difference of the rotation components between the recommended angle-of-view parameter and the current angle-of-view parameter. The execution unit 160 can, when the difference of the parallel displacement components is lower than a threshold and the difference of the rotation components is lower than a predetermined threshold, determine that the current angle of view is substantially equal to the recommended angle of view. The execution unit 160 may, on the basis of such difference, calculate the degree of closeness to the recommended angle of view (e.g., a score that becomes the maximum value when the difference is zero), and compare the calculated degree of closeness with a predetermined threshold. The display control unit 150 may display the thus calculated degree of closeness on the screen and change, according to the degree of closeness, the display attributes of the target object or the intermediate objects.

An operation executed when the current angle of view is substantially equal to the recommended angle of view may be, for example, an operation related to image capturing or an operation related to a subject. Hereinafter, three examples of an operation started by the execution unit 160 will be described.

Figure 11:
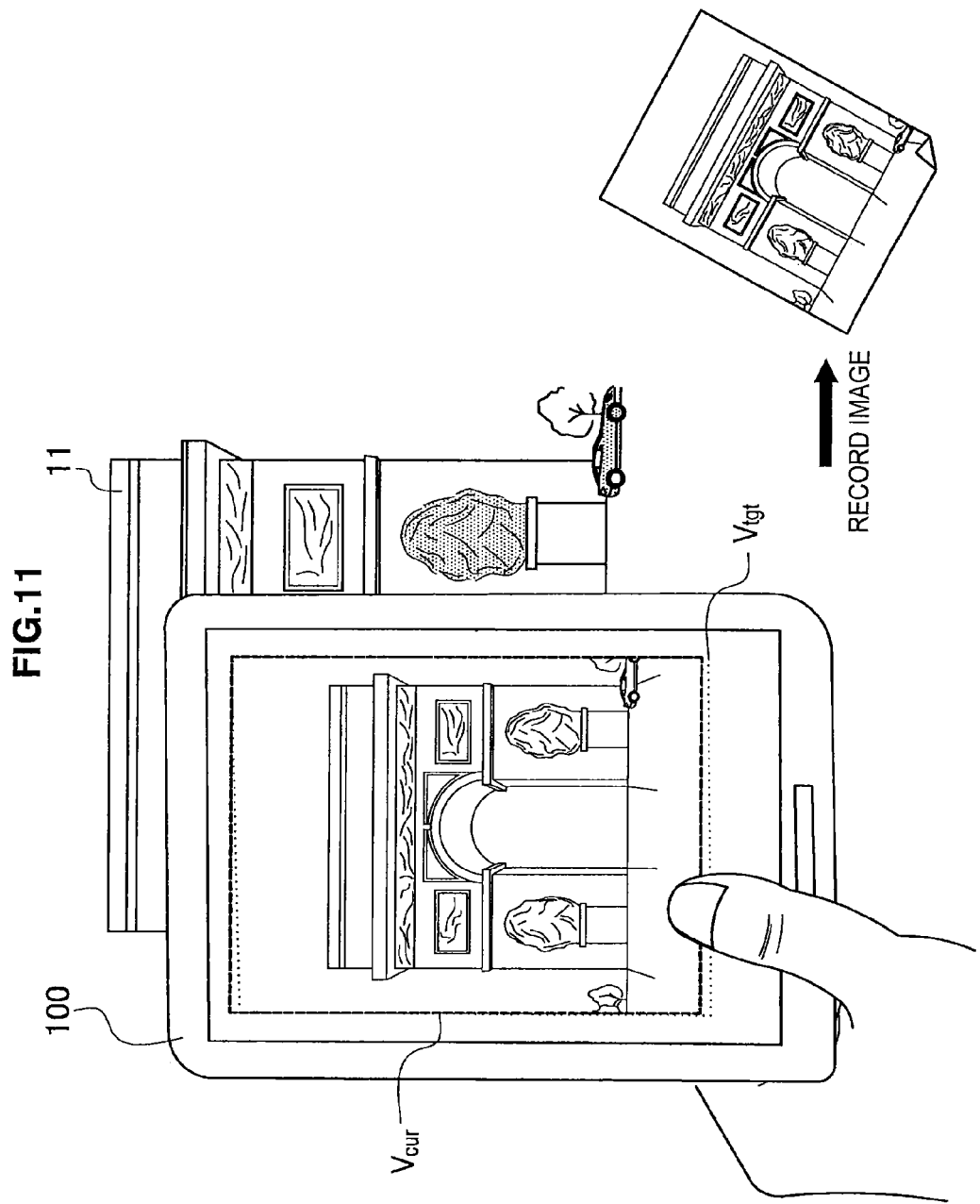
FIG. 11 is an explanatory diagram illustrating a first example of an operation executed when guidance of an angle of view has succeeded.

FIG. 11 is an explanatory diagram illustrating a first example of an operation executed when guidance of the angle of view has succeeded. The operation executed in the first example is so-called releasing with a digital still camera. Referring to FIG. 11, the position and attitude of the current angle-of-view object $V_{cur}$ are substantially identical to those of the target object $V_{tgt}$. The execution unit 160, when it is determined that the current angle of view is substantially identical to the recommended angle of view in this manner, automatically records an image of the subject captured by the imaging unit 102. Accordingly, the user is able to, only by matching the position and attitude of the terminal to the recommended angle of view, obtain a photograph similar to the recommended image without issuing a release instruction to the terminal.

Figure 12:
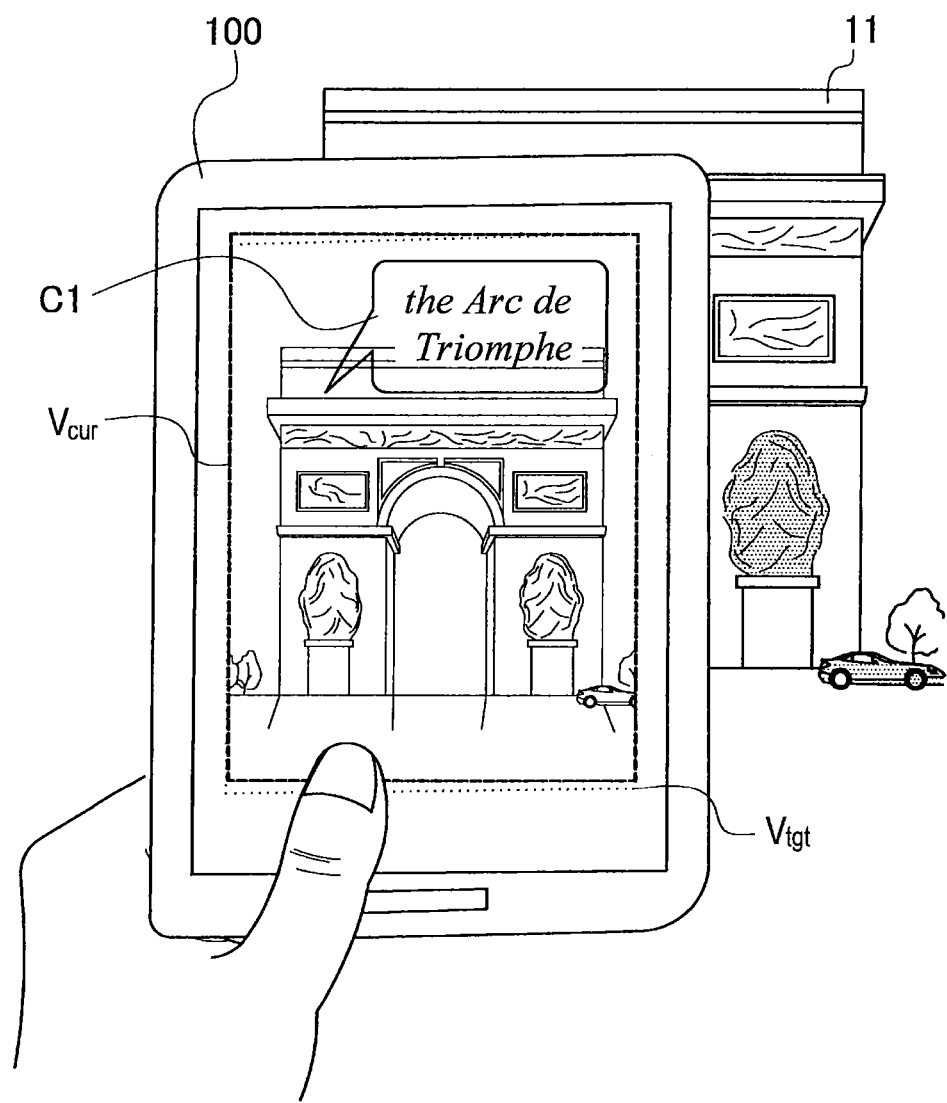
FIG. 12 is an explanatory diagram illustrating a second example of an operation executed when guidance of an angle of view has succeeded.

FIG. 12 is an explanatory diagram illustrating a second example of an operation executed when guidance of the angle of view has succeeded. The operation executed in the second example is acquisition or reproduction of content. Referring to FIG. 12, the position and attitude of the current angle-of-view object $V_{cur}$ are substantially identical to those of the target object $V_{tgt}$. The execution unit 160, when it is determined that the current angle of view is substantially identical to the recommended angle of view in this manner, acquires content associated with a subject to be imaged from a content server (the data server 200 or another server device). In the example in FIG. 12, information content C1 that displays the name of the subject 11 is acquired and displayed on the screen. When the position and attitude of the terminal are operated in conjunction with the acquisition or reproduction of content in this manner, it becomes possible for a service provider who wants the user to view the real object from a particular direction, for example, to provide a motivation for viewing content to the user and thus guide the user toward the particular direction. In such a case, the captured image need not necessarily be recorded, and a so-called through-image may be displayed together with the content at the recommended angle of view.

Figure 13:
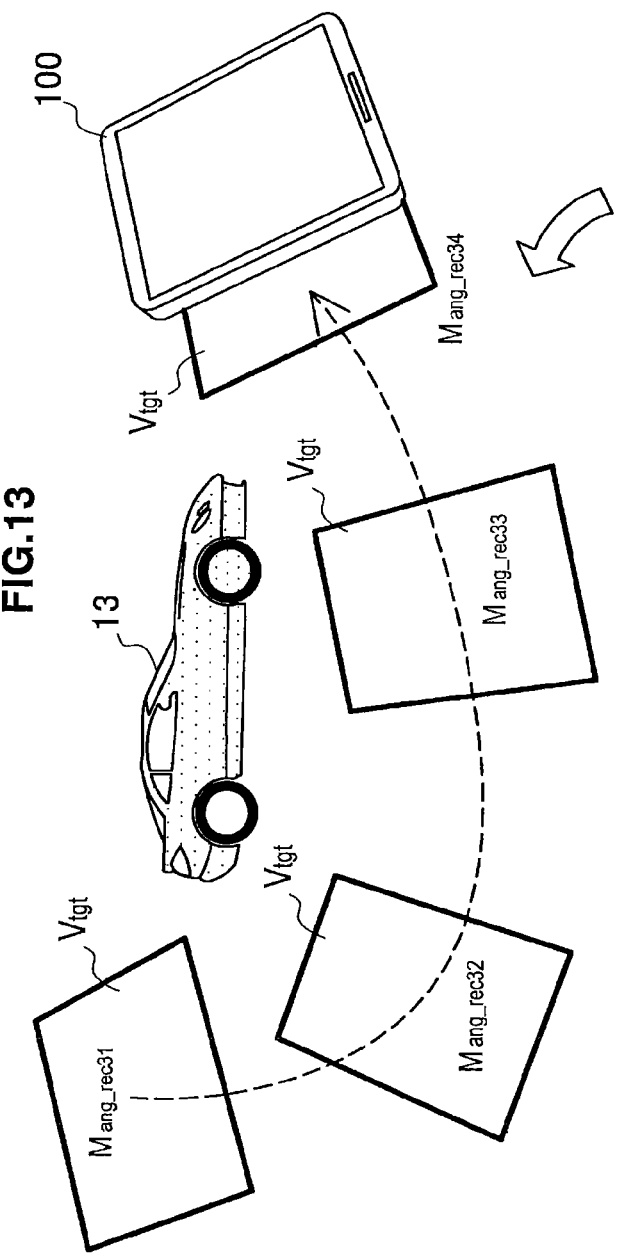
FIG. 13 is an explanatory diagram illustrating a third example of an operation executed when guidance of an angle of view has succeeded.

FIG. 13 is an explanatory diagram illustrating a third example of an operation executed when guidance of the angle of view has succeeded. The operation executed in the third example is guidance to a next subject or a next recommended angle of view. Referring to FIG. 13, for a subject 13 having a subject ID "B3," recommended angle-of-view sequence data including four recommended angle-of-view parameters $M_{ang\_rec31}$ to $M_{ang\_rec34}$ at timings T31 to T34 are shown. The display control unit 150 first overlays a target object $V_{tgt}$ on the input image at a position and attitude represented by the recommended angle-of-view parameter $M_{ang\_rec31}$ at the timing T31 of the recommended angle-of-view sequence data. The execution unit 160, when it is determined that the position and attitude of the current angle-of-view object $V_{cur}$ are substantially identical to those of the target object $V_{tgt}$, instructs the display control unit 150 to guide to the next recommended angle of view. Then, the display control unit 150 overlays the target object $V_{tgt}$ on the input image at the next position and attitude represented by the recommended angle-of-view parameter $M_{ang\_rec32}$ at the timing T32. Such determination of the execution unit 160 and guidance of the display control unit 150 can be repeated until guidance to the last recommended angle of view succeeds. A subject to be imaged may also be changed during the course of the sequence of the recommended angle of view.

In the third example, a still image captured by the imaging unit 102 at each of the recommended angles of view may be recorded (automatically or in response to a user input). Accordingly, images of various subjects can be successively recorded at different angles of view without the need for the user to re-select the recommended angle of view each time he/she captures an image of a subject. Alternatively, moving images of a sequence of the recommended angle of view may also be recorded. That is, it is possible to assist a user who is capturing a moving image while moving his/her terminal in the real space in effectively capturing the moving image by sequentially indicating motions of the terminal according to a preplanned transition of the angle of view.

<3. Configuration of Data Server>

Figure 14:
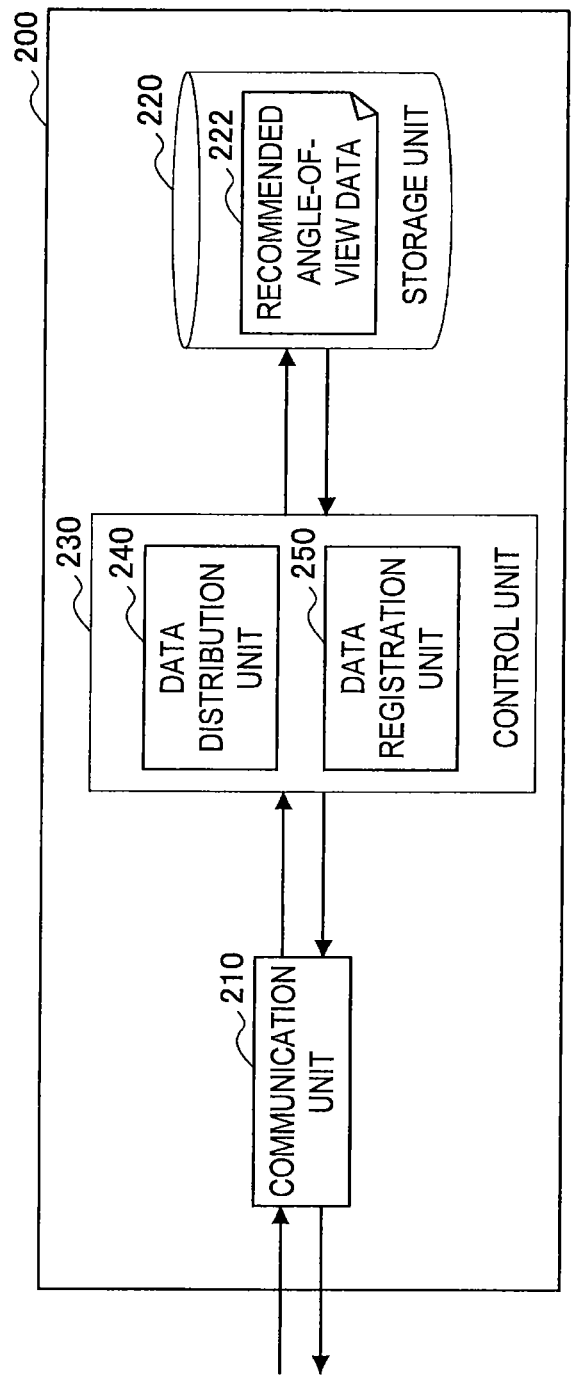
FIG. 14 is a block diagram showing an exemplary configuration of a data server according to an embodiment.

FIG. 14 is a block diagram showing an exemplary configuration of the data server 200. Referring to FIG. 14, the data server 200 includes a communication unit 210, a storage unit 220, and a control unit 230.

The communication unit 210 is a communication interface that intermediates communication of the data server 200 with another device. The communication unit 210 supports a given wireless communication protocol or wire communication protocol, and establishes a communication connection with the other device.

The storage unit 220 includes a storage medium such as semiconductor memory or a hard disk, and stores programs and data for processes to be performed by the data server 200. The data stored in the storage unit 220 includes the recommended angle-of-view data 222 having the structure exemplarily shown in FIG. 6 (or the recommended angle-of-view sequence data exemplarily shown in FIG. 13).

The control unit 230 corresponds to a processor such as a CPU or a DSP. The control unit 230, by executing the programs stored in the storage unit 220 or another storage medium, operates the functions of the data server 200. The data distribution unit 240 and the data registration unit 250 are examples of functional modules of the data server 200.

The data distribution unit 240 receives a data request from the image processing device 100 via the communication unit 210. The data request includes, for example, data used to select a recommended angle-of-view parameter, such as an identifier of the reference environment, position data, or an identifier of the subject. The data distribution unit 240 may, when the data request includes position data indicating the geographical position of the image processing device 100, select a recommended angle-of-view parameter associated with a subject located at a geographically close position from the recommended angle-of-view data 222, and distribute the selected recommended angle-of-view parameter to the image processing device 100. In addition, the data distribution unit 240 may, when the data request includes an identifier of a specified subject, select a recommended angle-of-view parameter associated with a subject identified by the identifier from the recommended angle-of-view data 222, and distribute the selected recommended angle-of-view parameter to the image processing device 100. The data distribution unit 240 may also distribute a plurality of recommended angle-of-view parameters to the image processing device 100.

The data registration unit 250 registers a new recommended angle-of-view parameter on the recommended angle-of-view data 222. The data registration unit 250, for example, receives from the imaging device 10 exemplarily shown in FIG. 1 an angle-of-view parameter, which represents a recommended image of a subject and an angle of view of when the recommended image was captured, and register the received angle-of-view parameter as a recommended image parameter. According to such a configuration, it is possible to receive a recommended image from a user and expand the recommended angle-of-view data. Thus, a database having various recommended angles of view can be easily constructed.

Further, the recommended angle-of-view parameter may be dynamically determined on the basis of a rule predefined for a subject as well as the position and attitude of the subject. The predefined rule may be, for example, that the recommended angle of view should be an angle of view at which an image of a subject is captured from its front side, an angle of view at which the golden ratio should be achieved for a particular index (e.g., the ratio of the width of a subject to the width of an image), or a main part of a subject (e.g., a face of a human) should be located at the center of the image. According to such a configuration, it is possible to, even when a recommended angle-of-view parameter is not prepared in advance, dynamically generate and use recommended image parameters for various subjects. Note that generation of a recommended image parameter according to such a rule may be performed either by the data server 200 or the data acquisition unit 140 of the image processing device 100.

<4. Process Flow>

Figure 15:
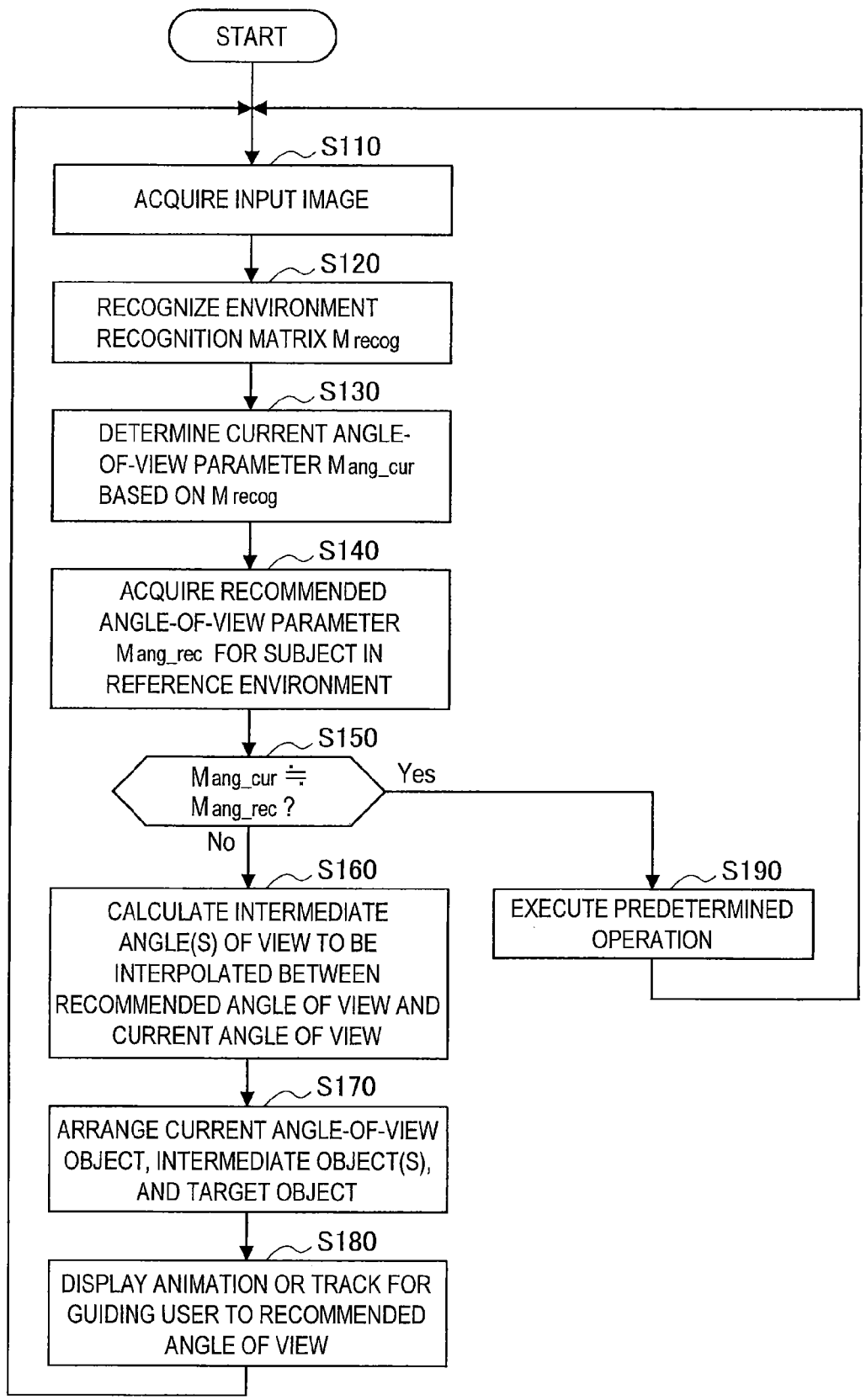
FIG. 15 is a flowchart showing an exemplary flow of an image processing method according to an embodiment.

FIG. 15 is a flowchart showing an exemplary flow of an image processing method executed with the image processing device 100 according to this embodiment.

Referring to FIG. 15, first, the image acquisition unit 120 acquires a captured image generated by the imaging unit 102 as an input image (step S110). Then, the image acquisition unit 120 outputs the acquired input image to the recognition unit 130 and the display control unit 150.

Next, the recognition unit 130 recognizes an environment recognition matrix $M_{recog}$ representing the position and attitude of the reference environment, using the input image (step S120). Then, the recognition unit 130 outputs the recognized environment recognition matrix $M_{recog}$ to the display control unit 150.

Next, the recognition unit 130, on the basis of the recognized environment recognition matrix $M_{recog}$, determines the current angle-of-view parameter $M_{ang\_cur}$ according to Formula (1) or Formula (2) above (step S130). Then, the recognition unit 130 outputs the determined current angle-of-view parameter $M_{ang\_cur}$ to the data acquisition unit 140, the display control unit 150, and the execution unit 160.

Next, the data acquisition unit 140, by transmitting a data request to the data server 200, for example, acquires a recommended angle-of-view parameter $M_{ang\_rec}$ for a subject in the reference environment (step S140). Then, the data acquisition unit 140 outputs the acquired recommended angle-of-view parameter to the display control unit 150 and the execution unit 150.

Next, the execution unit 160 determines, on the basis of the difference of the parallel displacement components and the difference of the rotation components between the recommended angle-of-view parameter $M_{ang\_rec}$ and the current angle-of-view parameter $M_{ang\_cur}$, determines if the current angle of view is substantially equal to the recommended angle of view (step S150). Herein, if it is determined that the current angle of view is substantially equal to the recommended angle of view, the process proceeds to step S190. Otherwise, the process proceeds to step S160.

In step S160, the display control unit 150 calculates one or more intermediate angles of view that interpolate(s) an angle(s) of view between the recommended angle of view and the current angle of view, using the recommended angle-of-view parameter $M_{ang\_rec}$ and the current angle-of-view parameter $M_{ang\_cur}$ (step S160).

Next, the display control unit 150 arranges the current angle-of-view object, one or more intermediate objects that represent(s) the intermediate angle(s) of view, and a target object in the reference environment (step S170).

Then, the display control unit 150, by overlaying such arranged virtual objects on the input image, causes a screen to display an animation or a track for guiding a user to the recommended angle of view (step S180).

Display of such virtual objects may be repeated until when it is determined that the current angle of view is substantially equal to the recommended angle of view. Note that the acquisition of the recommended angle-of-view parameter in step S140 may be, once performed, omitted thereafter.

When it is determined that the current angle of view is substantially equal to the recommended angle of view in step S150, the execution unit 160 executes a predetermined operation such as the one described with reference to FIGS. 11 to 13 related to image capturing or a subject, for example (step S190). Then, the process may be terminated or the process may return to step S110 to conduct new guiding.

<9. Conclusion>

Heretofore, an embodiment of the technology according to the present disclosure has been described in detail with reference to FIGS. 1 to 15. According to the aforementioned embodiment, a parameter representing the three-dimensional position and attitude of a device that captures an image of a subject at a recommended angle of view is used to overlay a virtual object, which guides a user so that the angle of view for capturing an image of the subject becomes closer to the recommended angle of view, on the image. Thus, it is possible to clearly present, to a user who attempts to capture an image of a subject in the three-dimensional real space, to which position and in what way the terminal should be moved and thus assist the user more effectively.

In addition, according to the aforementioned embodiment, one or more intermediate objects representing an intermediate angle(s) of view between a target object representing the recommended angle of view and the current angle of view is/are overlaid on the image. When only the target object is displayed on the two-dimensional screen, it is difficult to grasp the relative positional relationship between the recommended angle of view and the current angle of view. However, when such an intermediate angle(s) of view is/are explicitly shown, a user is able to more clearly grasp the three-dimensional movement of the terminal toward the recommended angle of view.

In addition, according to the aforementioned embodiment, the intermediate objects are arranged in the reference environment at positions and attitudes interpolated at non-even intervals between the recommended angle of view and the current angle of view. In addition, the display attributes of the intermediate object(s) gradually change according to the distance from the target object. Accordingly, it is possible to three-dimensionally emphasize the direction of guidance from the current angle of view toward the recommended angle of view including the depth direction.

In addition, according to the aforementioned embodiment, the recommended angle-of-view parameter can be registered on a database in association with the reference environment. Thus, the recommended angle of view can be shared by different users. Meanwhile, if the reference environment is recognized, it is possible to conduct guidance based on the recommended angle-of-view parameter even when a subject does not appear in the input image.

Note that the series of control processes performed by the devices described in this specification may be implemented using any of software, hardware, or a combination of both. A program that configures the software is stored in a storage medium provided in or outside each device in advance. Then, each program is read into RAM (Random Access Memory) in execution, and executed by a processor such as a CPU.

Part of the logical function of the image processing device 100 may be, instead of being implemented on the device, implemented on a device that resides in a cloud computing environment. In that case, information exchanged between the logical functions can be transmitted or received between the devices via the communication unit 112 exemplarily shown in FIG. 7.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as follows.

(1) An image processing device including:

a data acquisition unit configured to acquire a recommended angle-of-view parameter that represents a recommended angle of view for a subject in an environment that appears in an image; and a display control unit configured to overlay on the image a virtual object that guides a user so that an angle of view for capturing an image of the subject becomes closer to the recommended angle of view, using the recommended angle-of-view parameter, wherein the recommended angle-of-view parameter is a parameter that represents a three-dimensional position and attitude of a device that captures an image of the subject at the recommended angle of view.

(2) The image processing device according to (1), wherein the display control unit overlays on the image a target object representing the recommended angle of view, and one or more intermediate objects representing an intermediate angle (s) of view between the recommended angle of view and a current angle of view.

(3) The image processing device according to (2), further including:

a recognition unit configured to recognize a current angle-of-view parameter representing a current angle of view, using the image, wherein the display control unit determines arrangement of the one or more intermediate objects in the environment using the recommended angle-of-view parameter and the current angle-of-view parameter.

(4) The image processing device according to (3), wherein the one or more intermediate objects is/are arranged in the environment at a position(s) and an attitude(s) interpolated at non-even intervals between the recommended angle of view and the current angle of view.

(5) The image processing device according to any one of (2) to (4), wherein the display control unit changes display attributes of the one or more intermediate objects in a stepwise manner.

(6) The image processing device according to any one of (2) to (5), wherein the display control unit forms an animation for guiding the user by sequentially overlaying the target object and the one or more intermediate objects on a plurality of frames.

(7) The image processing device according to any one of (2) to (5), wherein the display control unit forms a track of an angle of view for guiding the user by overlaying the target object and the one or more intermediate objects on a single frame.

(8) The image processing device according to any one of (1) to (7), further including an execution unit configured to cause the image processing device to execute a predetermined operation when the current angle of view is determined to be substantially equal to the recommended angle of view.

(9) The image processing device according to (8), wherein the predetermined operation is recording of a captured image.

(10) The image processing device according to (8), wherein the predetermined operation is acquisition or reproduction of content associated with the subject.

(11) The image processing device according to (8), wherein the predetermined operation is guidance to a next subject or a next recommended angle of view.

(12) The image processing device according to any one of (1) to (11), wherein the recommended angle-of-view parameter is a parameter that represents an angle of view of when a recommended image of the subject is captured.

(13) The image processing device according to any one of (1) to (11), wherein the recommended angle-of-view parameter is a parameter that represents an angle of view determined based on a predefined rule for the subject and a position and an attitude of the subject.

(14) The image processing device according to any one of (1) to (13), wherein at least one of the data acquisition unit or the display control unit is implemented by a device that resides on a cloud computing environment instead of the image processing device.

(15) An image processing method including:
acquiring a recommended angle-of-view parameter representing a three-dimensional position and attitude of a device that captures an image of a subject in an environment that appears in an image at a recommended angle of view; and
overlaying on the image a virtual object for guiding a user so that an angle of view for capturing an image of the subject becomes closer to the recommended angle of view, using the recommended angle-of-view parameter.

(16) A program for causing a computer to function as:
a data acquisition unit configured to acquire a recommended angle-of-view parameter that represents a recommended angle of view for a subject in an environment that appears in an image; and
a display control unit configured to overlay on the image a virtual object that guides a user so that an angle of view for capturing an image of the subject becomes closer to the recommended angle of view, using the recommended angle-of-view parameter,
wherein the recommended angle-of-view parameter is a parameter that represents a three-dimensional position and attitude of a device that captures an image of the subject at the recommended angle of view.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-026871 filed in the Japan Patent Office on Feb. 10, 2012, the entire content of which is hereby incorporated by reference.

What is claimed is:

1. An image processing device comprising:
circuitry configured to:
acquire a recommended angle-of-view parameter that represents a recommended angle of view for a subject in an environment that appears in an image;
overlay on the image a virtual object that guides a user so that an angle of view for capturing an image of the subject becomes closer to the recommended angle of view, using the recommended angle-of-view parameter,
wherein the recommended angle-of-view parameter is a parameter that represents a three-dimensional position and attitude of a device that captures an image of the subject at the recommended angle of view;
overlay on the image a target object representing the recommended angle of view, and intermediate objects representing intermediate angles of views between the recommended angle of view and a current angle of view;
form an animation for guiding the user by sequentially overlaying the target object and the intermediate objects on a plurality of frames, such that the target object and the intermediate objects on the plurality of frames are simultaneously displayed; and
change display attributes of the intermediate objects in a stepwise manner, such that one of the intermediate objects closest to the target object has a peripheral line that is thicker than a peripheral line of another one of the intermediate objects farther away from the target object.

2. The image processing device according to claim 1, wherein the circuitry is configured to:
recognize a current angle-of-view parameter representing the current angle of view, using the image, and
determine an arrangement of the intermediate objects in the environment using the recommended angle-of-view parameter and the current angle-of-view parameter.

3. The image processing device according to claim 2, wherein the intermediate objects are arranged in the environment at positions and attitudes interpolated at non-even intervals between the recommended angle of view and the current angle of view.

4. The image processing device according to claim 1, wherein the circuitry is configured to form a track of an angle of view for guiding the user by overlaying the target object and the intermediate objects.

5. The image processing device according to claim 1, wherein the circuitry is configured to cause the image processing device to execute a predetermined operation when the current angle of view is determined to be substantially equal to the recommended angle of view.

6. The image processing device according to claim 5, wherein the predetermined operation is recording of a captured image.

7. The image processing device according to claim 5, wherein the predetermined operation is acquisition or reproduction of content associated with the subject.

8. The image processing device according to claim 5, wherein the predetermined operation is guidance to a next subject or a next recommended angle of view.

9. The image processing device according to claim 1, wherein the recommended angle-of-view parameter is a parameter that represents an angle of view of when a recommended image of the subject is captured.

10. The image processing device according to claim 1, wherein the recommended angle-of-view parameter is a parameter that represents an angle of view determined based on a predefined rule for the subject and a position and an attitude of the subject.

11. The image processing device according to claim 1, wherein the circuitry is configured to operate in conjunction with a device that resides on a cloud computing environment.

12. An image processing method comprising:
acquiring a recommended angle-of-view parameter representing a three-dimensional position and attitude of a device that captures an image of a subject in an environment that appears in an image at a recommended angle of view;

overlaying on the image a virtual object for guiding a user so that an angle of view for capturing an image of the subject becomes closer to the recommended angle of view, using the recommended angle-of-view parameter;

overlaying on the image a target object representing the recommended angle of view, and intermediate objects representing intermediate angles of views between the recommended angle of view and a current angle of view;

forming an animation for guiding the user by sequentially overlaying the target object and the intermediate objects on a plurality of frames, such that the target object and the intermediate objects on the plurality of frames are simultaneously displayed; and changing display attributes of the intermediate objects in a stepwise manner, such that one of the intermediate objects closest to the target object has a peripheral line that is thicker than a peripheral line of another one of the intermediate objects farther away from the target object.

13. A non-transitory computer readable medium having a computer program recorded thereon, the computer program configured to perform a method when executed on a computer, the method comprising:

acquiring a recommended angle-of-view parameter that represents a recommended angle of view for a subject in an environment that appears in an image;

overlaying on the image a virtual object that guides a user so that an angle of view for capturing an image of the subject becomes closer to the recommended angle of view, using the recommended angle-of-view parameter, wherein the recommended angle-of-view parameter is a parameter that represents a three-dimensional position and attitude of a device that captures an image of the subject at the recommended angle of view;

overlaying on the image a target object representing the recommended angle of view, and intermediate objects representing intermediate angles of views between the recommended angle of view and a current angle of view;

forming an animation for guiding the user by sequentially overlaying the target object and the intermediate objects on a plurality of frames, such that the target object and the intermediate objects on the plurality of frames are simultaneously displayed; and changing display attributes of the intermediate objects in a stepwise manner, such that one of the intermediate objects closest to the target object has a peripheral line that is thicker than a peripheral line of another one of the intermediate objects farther away from the target object.

\* \* \* \* \*